United States Patent [19]
Hansen

[11] Patent Number: 6,050,421
[45] Date of Patent: Apr. 18, 2000

[54] AUTOMATIC LAUNDRY TIE-OFF APPARATUS AND METHOD

[75] Inventor: Kel Albert Hansen, Cornelius, N.C.

[73] Assignee: Jensen USA, Inc., Fort Mill, S.C.

[21] Appl. No.: 08/927,851

[22] Filed: Sep. 11, 1997

[51] Int. Cl.[7] .................................................. B07C 5/00
[52] U.S. Cl. .................. 209/44.1; 209/912; 209/937; 198/465.4; 223/88; 223/DIG. 4
[58] Field of Search .................... 209/44.1, 559, 209/912, 937; 198/465.4, 606; 223/85, 88, DIG. 4

[56] References Cited

U.S. PATENT DOCUMENTS

| | | | |
|---|---|---|---|
| 4,940,174 | 7/1990 | Parker | 224/257 |
| 5,238,122 | 8/1993 | Hart | 209/937 X |
| 5,687,851 | 11/1997 | Schonenberger | 198/606 X |

FOREIGN PATENT DOCUMENTS

| | | | |
|---|---|---|---|
| 4026546 | 2/1991 | Germany | 209/937 |
| 6-32419 | 2/1994 | Japan | 209/937 |

OTHER PUBLICATIONS

Metrilink A Safer Way for One–Way Hangers; Publication date was prior to the date this application was filed; pp. 1&2; AB Metric Interconveyor.

Metricon Conveyor System for the Laundry Industry; Publication date was prior to the date this application was filed; pp. 1–4; AB Metric Interconveyor.

*Primary Examiner*—Tuan N. Nguyen
*Attorney, Agent, or Firm*—Adams Law Firm, P.A.

[57] ABSTRACT

An automated laundry sorting system is disclosed of the type wherein previously-laundered laundry items on hangers are tagged with electronic identification devices and sorted into predetermined groups. The improvement includes an automatic joining apparatus for electronically separating the predetermined groups from each other and then physically joining together the laundry items representing a single group, such as garments belonging to a single employee.

14 Claims, 8 Drawing Sheets

AUTOMATIC LAUNDRY TIE-OFF APPARATUS AND METHOD

TECHNICAL FIELD AND BACKGROUND OF THE INVENTION

This invention relates to an automatic laundry tie-off apparatus and method. The invention has general application in automated laundry facilities and, in particular, in large, automated commercial laundry facilities where uniforms and similar garment items are delivered for laundering. The invention also has application in other types of laundry facilities and for other types of laundry items.

Many employers furnish uniforms for employees. These uniforms are sized for the employee and often labeled with the employee's name. When soiled they are typically collected at the employer's place of business by a commercial laundry truck and taken to a laundry facility for laundering, and thereafter returned on regular schedule to the employer's place of business for use by the employee.

Historically, this type of commercial laundry processing was very labor intensive. Extensive labeling and sorting was required, and much hand-work was necessary to insure that laundry collected from a particular customer was properly delivered back to the same customer on the proper schedule, and with all of the garments properly sorted by employee, department or other necessary criteria. Much effort has gone into automating these types of processes, and prior art patents such as U.S. Pat. Nos. 5,419,439, 5,125,513 and 3,550,772 disclose means by which many of the steps carried out during the entire laundering process have been improved in reliability and made less labor-intensive.

However, the final steps of processing the laundry items, which include identifying the items by group and then physically joining the items in that group together have not yet been successfully automated. These are important steps in the process, since the laundered items must be sorted properly according to where they must be delivered and according to the employee to whom they are assigned. Even in otherwise highly automated laundry facilities, it is typical for laundry items to be manually examined to determine the name of the employee to whom the garments belong, to physically group the garments together and then apply a twist-tie or some other similar type of tie to the neck of the garment hangers, thereby grouping the garments according to employee.

The present invention provides a reliable means of automatically grouping laundry items, such as garments, and then automatically physically joining together the laundry items according to a predetermined group identity, such as by employee, plant location, department, or the like.

SUMMARY OF THE INVENTION

Therefore, it is an object of the invention to provide in an automated laundry sorting system of the type wherein previously-laundered laundry items on hangers are tagged with electronic identification devices and sorted into predetermined groups, a way to electronically separate the predetermined groups from each other and physically join together the laundry items representing a single group.

It is another object of the invention to provide an automated laundry tie-off apparatus which completes the automation of an otherwise automated laundry.

It is another object of the invention to provide an automated laundry tie-off apparatus which automatically detaches a motherhook carrying identification information from the thin-gauge wire hanger on which the laundry item is carried.

It is another object of the invention to provide an automated laundry tie-off apparatus which ties together laundry items belonging to a single group with a twist-tie or similar attaching device.

These and other objects of the present invention are achieved in the preferred embodiments disclosed below by providing in an automated laundry sorting system of the type wherein previously-laundered laundry items on hangers are tagged with electronic identification devices and sorted into predetermined groups, the improvement comprising an automatic joining apparatus for electronically separating the predetermined groups from each other and physically joining together the laundry items representing a single group.

According to one preferred embodiment of the invention, the tie-off apparatus comprises a feed conveyor for feeding the laundry items downstream one at a time and a reader for reading the electronic identification device to determine the identity of the laundry item and the group to which each laundry item belongs. A divorcing means separates the electronic identification device from the laundry item, according to the criteria wherein if the laundry item is determined by the reader to belong to the same group as the preceding laundry item, the divorcing means divorces the electronic identification device from the laundry item and delivers the laundry item downstream into proximity with other laundry items in the same group. If the laundry item is determined by the reader to belong to a different group than the preceding laundry item, the divorcing means delays divorcing the electronic identification device from the laundry item.

According to another preferred embodiment of the invention, the joining device comprises a tie-off apparatus for tying together the hangers on which the laundry items are carried.

According to yet another preferred embodiment of the invention, the laundry sorting system includes a limit sensor cooperating with the feed conveyor for sensing the number of laundry items in position on the feed conveyor to be fed downstream to the divorcing means, and stop means responsive to the limit sensor for stopping the movement of the motherhooks on the feed conveyor when the number of laundry items in position to be fed downstream to the divorcing means exceeds a predetermined number equal to or less than the capacity of the divorcing means at any given time.

According to yet another preferred embodiment of the invention, the feed conveyor includes a presence sensor for determining whether laundry items are present in the feed conveyor for being fed to the divorcing means, and a hook for selectively releasing a laundry item for movement to the divorcing station for removal of the electronic identification device.

Preferably, the laundry items move from the feed conveyor to the divorcing station by gravity.

According to yet another preferred embodiment of the invention, the electronic identification devices comprise digitally-coded passive inductance transmitters.

According to yet another preferred embodiment of the invention, the laundry items are carried on respective thin-gauge wire hangers, and a one of the transmitters is carried by a motherhook onto which respective wire hangers are releasably attached.

According to yet another preferred embodiment of the invention, the divorcing station comprises a first downwardly directed rail on which the laundry items are gravity-fed to the joining apparatus and a second downwardly directed rail diverging from the first rail and on which the motherhooks are conveyed to a collection station for re-use after separation from the laundry items at the divorcing station.

An embodiment of the method according to the invention comprises the steps of electronically separating the predetermined groups from each other and then physically joining together the laundry items representing a single group.

According to another preferred embodiment of the invention, the method includes the steps of feeding the laundry items downstream one at a time, reading the electronic identification device to determine the identity of the laundry item and the group to which each laundry unit belongs, separating the electronic identification device from the laundry item, wherein if the laundry item is determined to belong to the same group as the preceding laundry item, the electronic identification device is divorced from the laundry item and the laundry item is delivered downstream into proximity with other laundry items in the same group, and if the laundry item is determined to belong to a different group than the preceding laundry item, the electronic identification device is delayed in separating the motherhook from the laundry item.

According to yet another preferred embodiment of the invention, the step of joining the laundry items together comprises the step of tying together the hangers on which the laundry items are carried.

According to yet another preferred embodiment of the invention, the invention includes the steps of sensing the number of laundry items in position to be conveyed downstream to where the electronic identification device is divorced from the laundry item and stopping the movement of the laundry items being fed downstream when the number of the laundry items is a predetermined number.

According to yet another preferred embodiment of the invention, the method of the invention includes the steps of determining whether laundry items are present on a feed conveyor for being fed to a divorcing means for divorcing the laundry item from the electronic identification device, selectively releasing a laundry item for movement to the divorcing station for removal of the electronic identification device.

According to yet another preferred embodiment of the invention, the method includes the step of moving the laundry items into position where the step of removing the electronic identification device from the laundry item is carried out.

According to yet another preferred embodiment of the invention, the step of reading the electronic identification device to determine the identity of the laundry item and the group to which each laundry unit belongs comprises the step of transmitting a radio frequency interrogation signal to the electronic identification device and reading an induced return signal transmitted by the electronic identification device indicative of the identity of the laundry item.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

General Description of Processes Upstream of Tie-Off Apparatus

Figure 1:
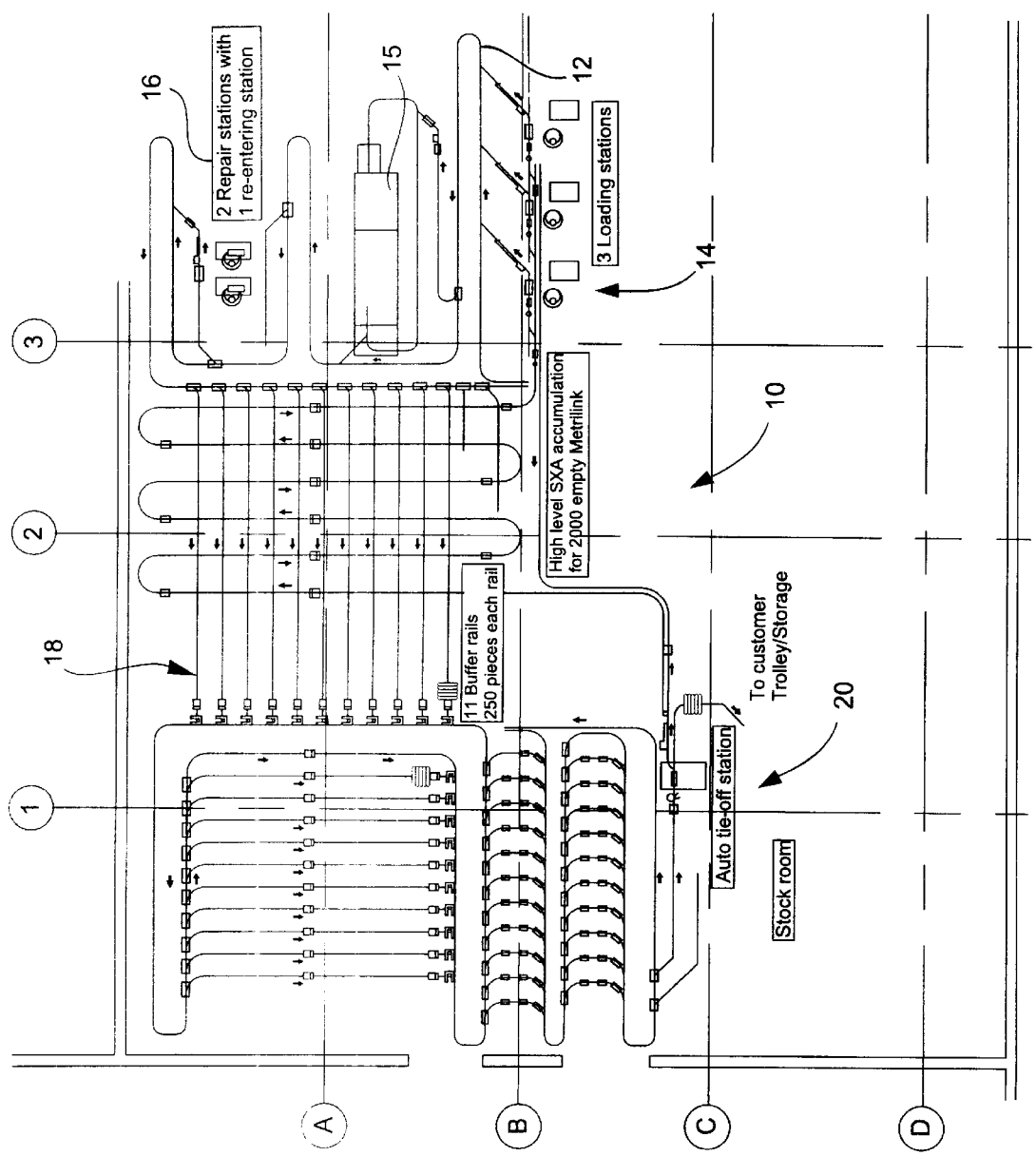
FIG. 1 is a schematic top plan view of a typical automated laundry facility and which, in addition, includes an automatic tie-off apparatus according to an embodiment of the invention.
Figure 2:
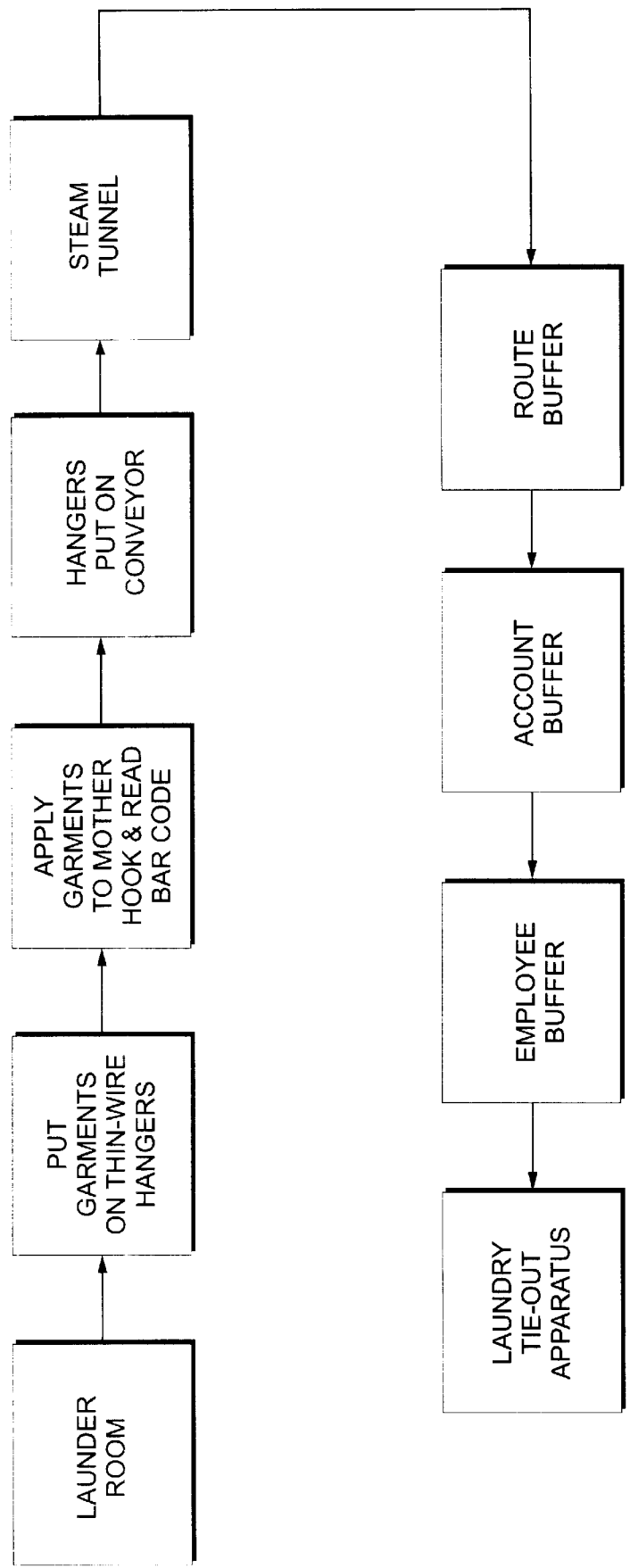
FIG. 2 is a block diagram of the facility shown in FIG. 1.

Referring now specifically to the drawings, a plan view of a typical automated laundry facility which includes an automatic tie-off apparatus according to an embodiment of the invention according to the present invention is illustrated in FIG. 1 and shown generally at reference numeral 10. A block diagram and flow chart of the laundry sorting system of which the invention is a part is also shown in FIG. 2.

In general, the purpose of the invention is to verify at the end of a laundry sorting system that each group of laundry belongs to a single unit, such as a single employee, and to physically join those laundry items together correctly. For purposes of explanation, reference will be made below to an "employee" as the single unit, although the term can also apply to any category of items for which a separate identity is necessary.

Each garment is identified with a unique identifier, such as a bar code patch, when assigned to an employee, and this information is entered into and stored in a computer. When soiled laundry is delivered to the laundry for cleaning, it is laundered randomly without regard to its identity. After laundering, an operator places the laundered garment on a conventional thin-gauge wire hanger 19 (see FIG. 3), and the bar code on the garment are read by a bar code reader and the data entered into the computer. The operator then mates the wire hanger with a conventional "motherhook" 22 and places the garment onto a conveyor 12 in a "marrying" station by hooking the motherhook over the rail of a conveyor 12. A motherhook is a plastic bracket attached to a hook for being suspended from a conveyor or rail. The plastic bracket includes a holder for an passive inductance transmitter and a latch mechanism for carrying the conventional thin-gauge wire garment hanger 19 and a release mechanism for releasing the hanger 19.

Each motherhook 22 carries a passive inductance transmitter with a discrete identity, commonly referred to as a "chip." This chip is read by a chip reader and the information transmitted by the chip is integrated with the bar code information identifying the garment, so that now the computer has data which can identify which individual motherhooks are carrying garments belonging to particular employees. These processes take place at reference number 14. The conveyor 12 then transports the garments through a steam tunnel 15 and/or other finishing processes. Garments may be manually diverted to permit repairs such as mending tears or replacing missing buttons at a repair station 16.

At this point the chip is read again and the garments are assigned to one of several buffer rails 18. The buffer rails 18 are assigned to different delivery routes, and the garments are assigned to a particular buffer rail 18. At this point all garments intended for delivery on a single route are located in a single buffer.

From this point on the garments are directed onto and through successive sorting areas in a manner disclosed in prior art patents. The garments are sorted and placed in a buffer where the garments are sorted to the point where they are organized according to an individual employee, with a single employee's garments positioned next to each other on a rail. See FIG. 2.

At this point conventional practice is for an operator to manually examine the garments, determine the proper grouping so that a single employee's garments are in a single group or successive groups, remove the motherhook, manually tie a twist tie around the neck of the thin gauge wire hangers, and remove the grouped garments to a delivery truck for delivery to the employee's place of employment.

In accordance with the invention, an automatic tie-off station 20 is provided at the end of the laundry processing line, as is shown in FIG. 1.

Figure 3:
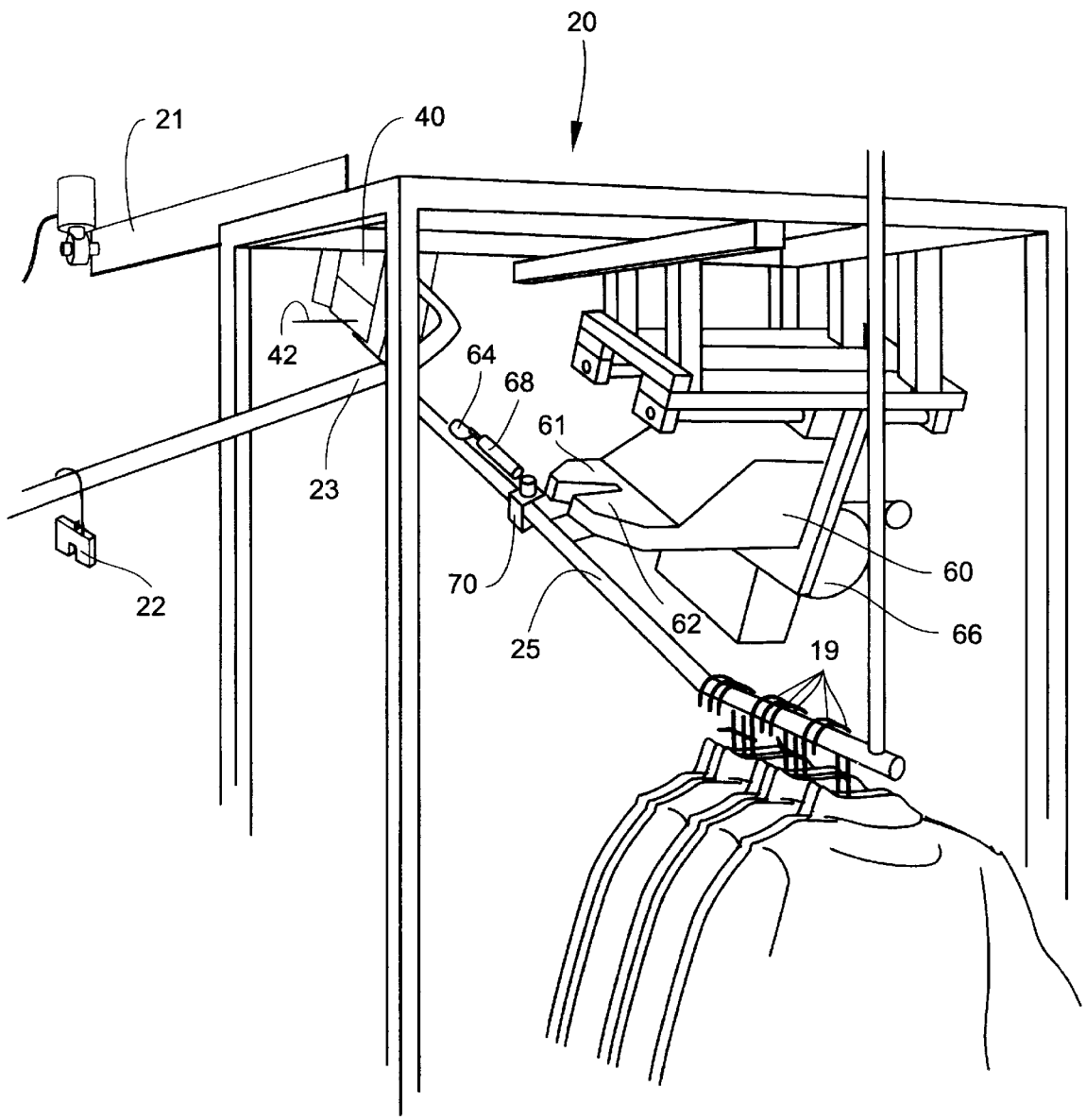
FIG. 3 is a simplified perspective view of the tie-off apparatus according to a preferred embodiment of the invention.

Referring now to FIG. 3, the general arrangement of the tie-off apparatus 20 is shown. A feed conveyor 21 delivers garments which have been sorted so that an individual employee's garments are all positioned next to each other, but are not physically joined to each other in any way. The thin-gauge wire hanger 19 still attached to a motherhook 22, as shown in FIG. 4.

A divorcing station 40 detaches the motherhook 22 from the wire hanger 19, diverts the motherhooks 22 down a rail 23 for re-use and delivers the garments down another rail 25 to a tie-off device 60 which bundles a group of about 2–10 garment-carrying hangers 19 together and wraps a twist-tie around the neck of the hangers 19. All of the garments in a single group belong to a single employee.

Figure 4:
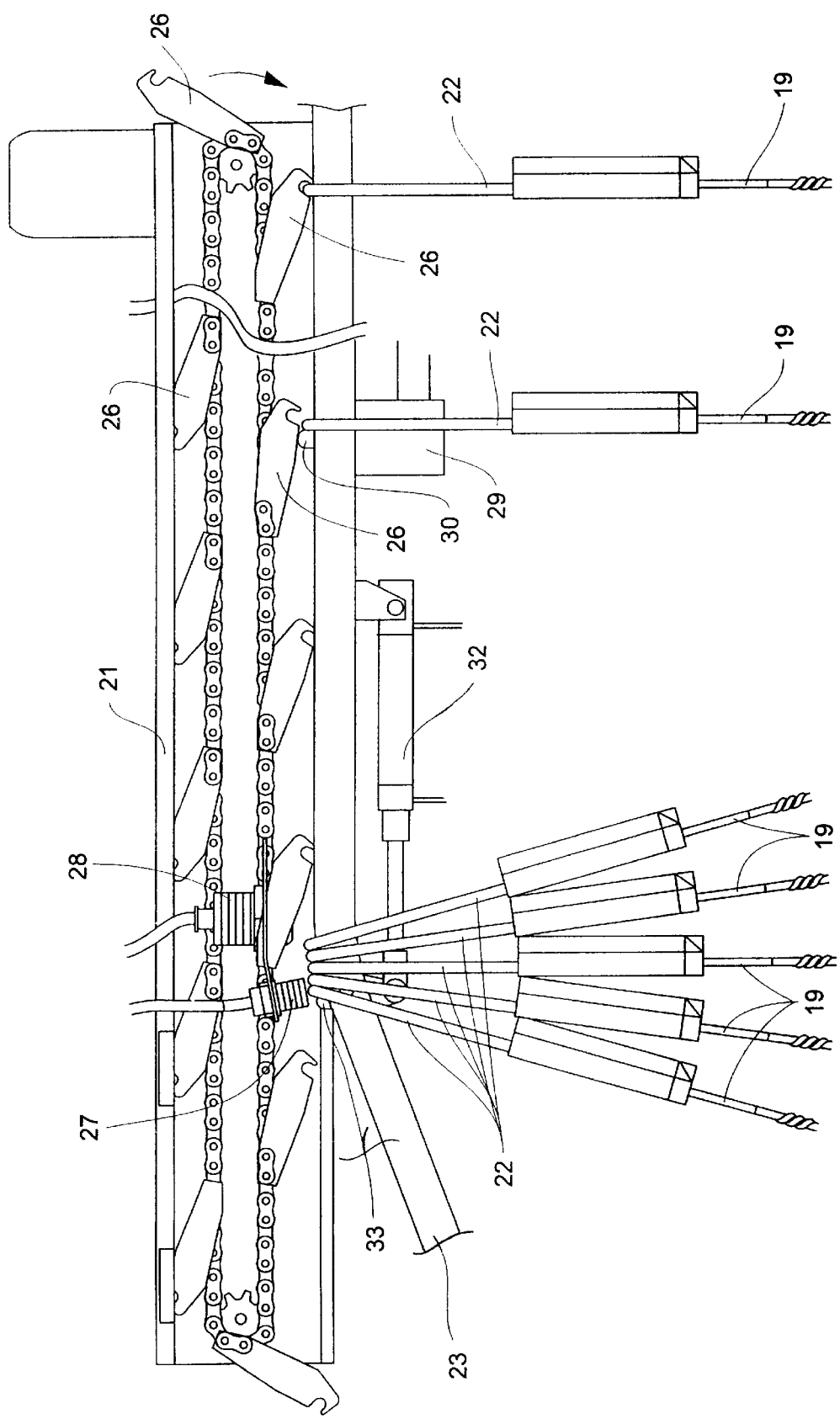
FIG. 4 is a side elevation of the feed conveyor assembly of the tie-off apparatus.

Referring now more specifically to the drawings, FIG. 4 shows the feed conveyor delivering garments from an upstream sorting buffer. As garments are fed onto the feed conveyor 21, conveyor hooks 26 grab the top of the motherhook 22 and pull it forward to the discharge end of the conveyor 21, where several garments are accumulated. A presence sensor 27 determines the presence of a motherhook 22 at the discharge end of the feed conveyor 21. A group limit sensor 28 limits the accumulation of motherhooks 22 to about 3–4. Both the presence sensor 27 and the group limit sensor 28 are inductance-type sensors which detect the presence of metal. When, as is shown in FIG. 4, 3–4 motherhooks 22 have accumulated at the discharge end of the feed conveyor 21, the group limit sensor signal 28 activates a solenoid 29 which moves a plunger 30 upwardly above the level of the conveyor 21 to a point which interferes with the movement of the motherhooks 22 along the feed conveyor 21. As is shown in FIG. 4, the conveyor hooks 26 ride up over the plunger 30 so that the motherhook 22 is not pulled further along the feed conveyor 21.

The motherhooks 22 are held at the discharge end of the feed conveyor 21 by a step feeder, which includes a piston-and-cylinder assembly 32 which operates a retention hook 33. When the divorce station calls for a garment, as described in further detail below, the presence sensor 27 determines that a motherhook 22 is present at the retention hook 33. If so, the piston-and-cylinder assembly retracts the retention hook 33 momentarily and a single motherhook 22 is fed by gravity down the rail 23. The plunger 30 retracts and another motherhook 22 is delivered to the discharge end of the conveyor 21.

Figure 5:
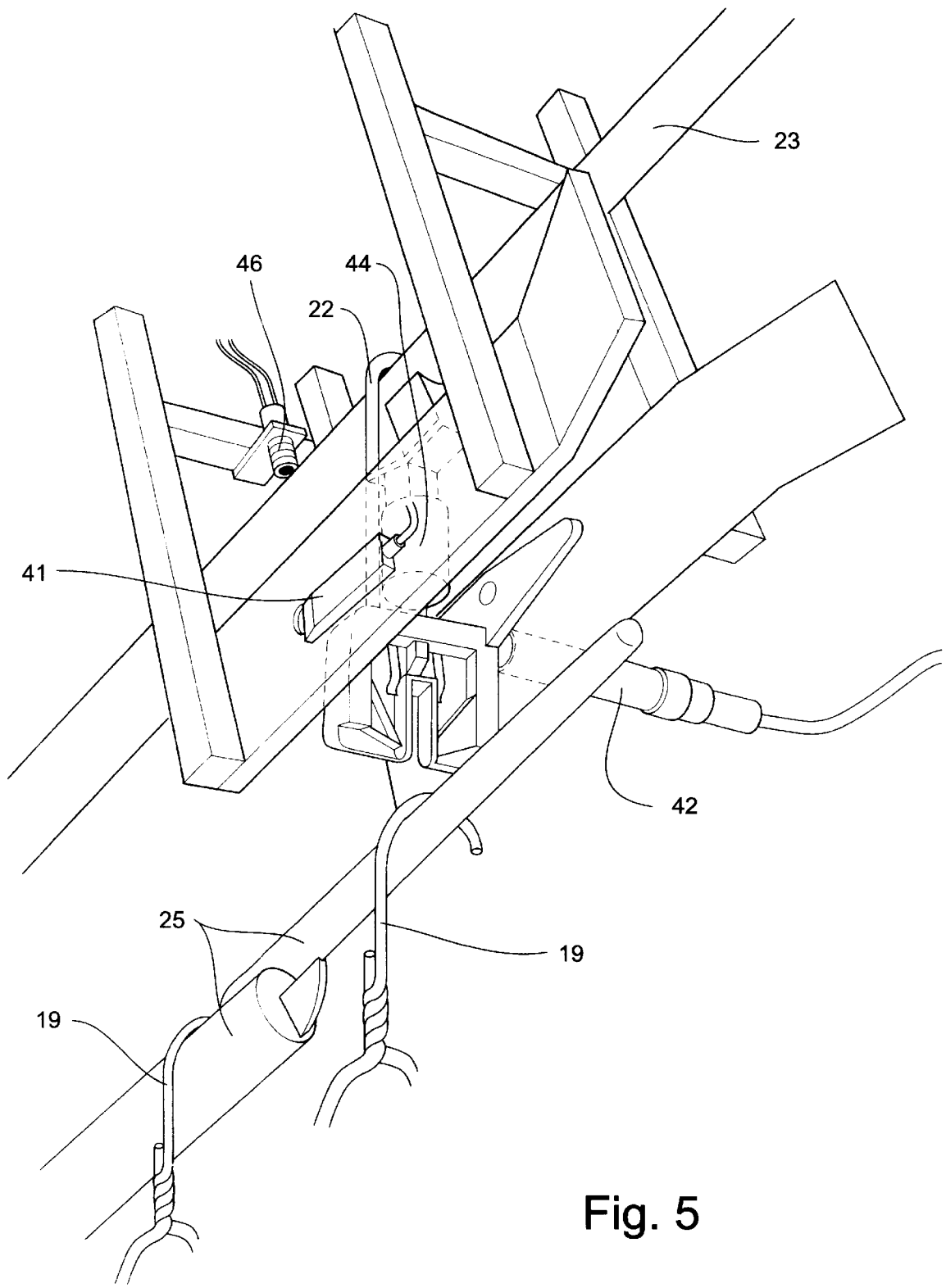
FIG. 5 is a perspective view of the divorcing station of the tie-off apparatus.
Figure 7:
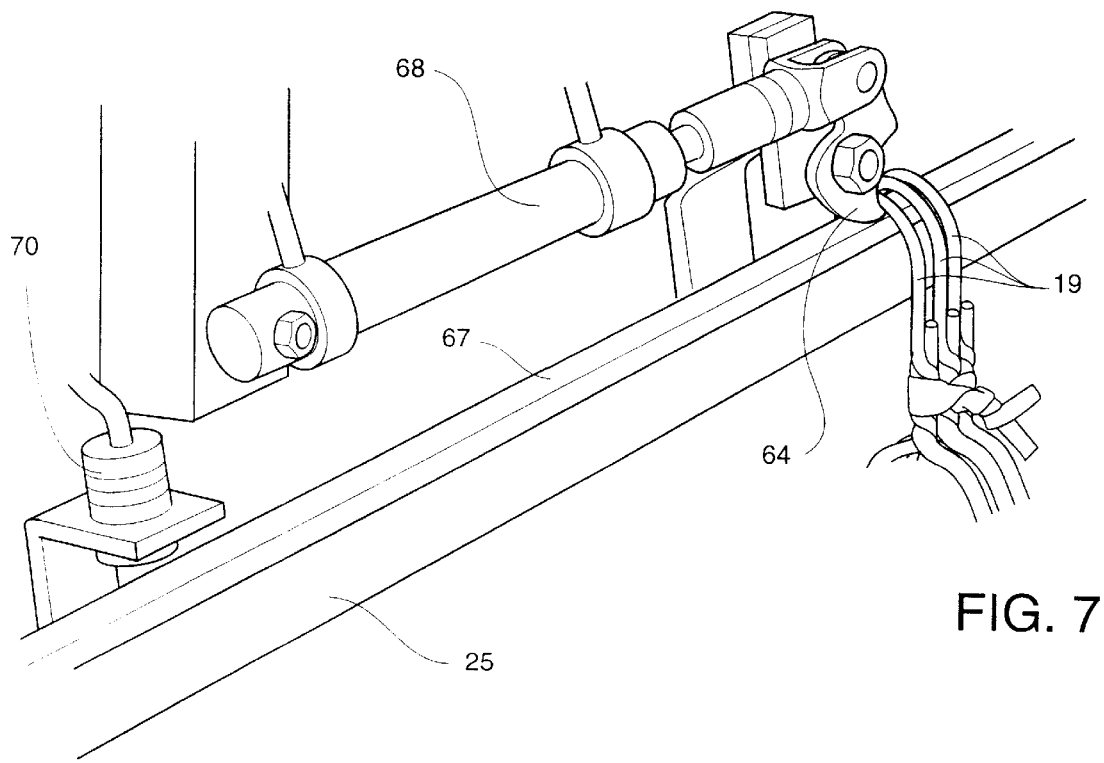
FIG. 7 is a fragmentary perspective view of the tie-off stop hook in the tie-off position.
Figure 8:
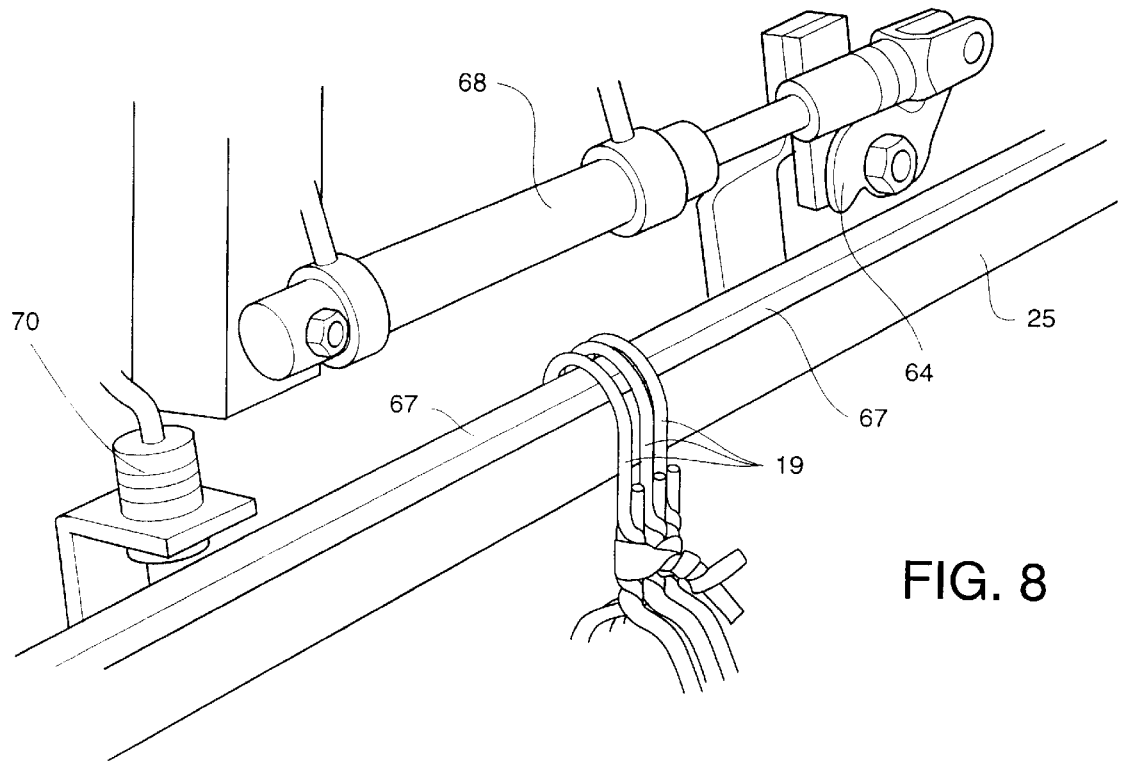
FIG. 8 is a fragmentary perspective view of the tie-off stop hook in the release position.

Referring now to FIG. 5, each motherhook 22 is fed individually to the divorce station 40. The divorce station 40 has three sensors. A photocell sensor 41 determines that a motherhook 22 is in the divorce station 40 and that it is in the correct position within the divorce station 40. A chip reader 42 reads the chip in the motherhook 22, communicates with the data stored in the computer, and determines whether the garment belongs to the same employee as the garment mated with the previous motherhook 22. If the garment mated with the motherhook 22 in the divorce station 40 belongs to the same employee as the previous garment, a plunger 44 detaches the motherhook 22 from the thin-gauge hanger 19 on which the garment is carried and sends the motherhook 22 down the rail 23 and to a re-use bin. The hanger 19 on which the garment is carried slides down the rail 25 to the tie-off device 60, and is stopped in front of the tie-off device by a stop hook 64, as shown in FIGS. 7 and 8.

If the chip reader 42 determines that the garment belongs to a different employee, this means that the last garment belonging to the previous employee has already been sent to the tie-off device 60. Therefore, the divorce is halted with the new motherhook 22 in the divorce station 40, and the tie-off device 60 is commanded to initiate the tie-off. Once this process is completed, as described below, the separation of the motherhook 22 from the hanger 19 in the divorce station 40 is completed and the next hanger 19 carrying the first garment for the next employee is sent to the tie-off device 60.

A sensor 46 determines that the motherhook 22 has left the divorce station 40 so that a new motherhook 22 can enter the divorce station 40. This occurs when the retention hook 33 retracts and allows another motherhook 22 to slide down rail 23.

A solenoid (not shown) positioned on the top of the rail 23 stops the motherhook 22 in the proper position for separation from the hanger 19. A second solenoid (not shown) operates plunger 44 which separates the motherhook 22 from the hanger 19 by a downward stroke onto the disengagement latch of the motherhook 22.

Figure 6:
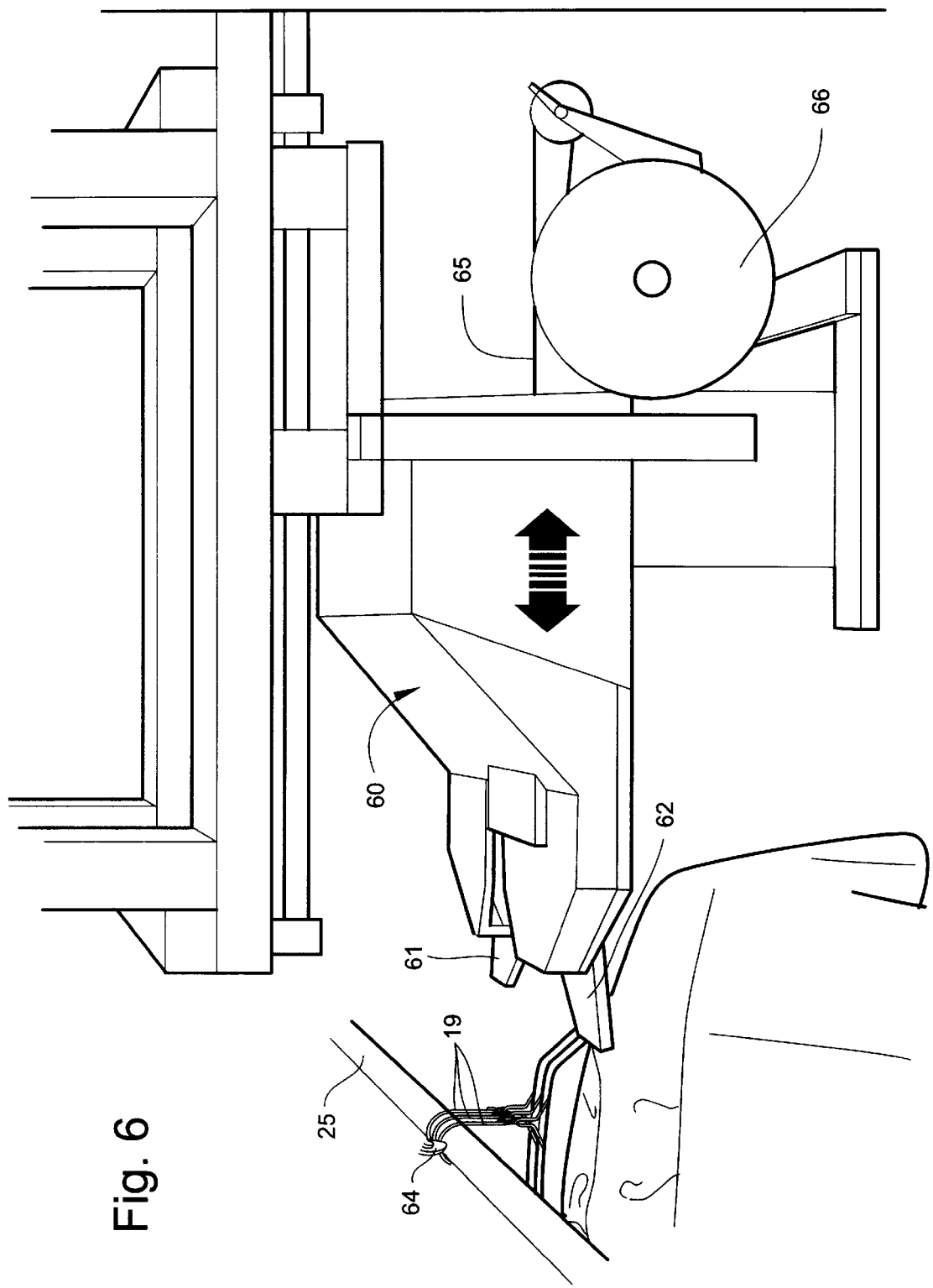
FIG. 6 is a fragmentary perspective view of the tie-off apparatus of an embodiment of the invention.

Referring now to FIG. 6, the tie-off device 60 is mounted on slide rails for reciprocating movement perpendicular to the direction of travel of the garments on the rail 25. The tie-off device 60 is also articulated at an angle generally in alignment with the angle of downward direction of the rail 25. The tie-off device 60 has a pair of diverging arms 61, 62 which form a narrowed throat. When a tie-off is signaled, the tie-off device 60 moves inwardly, and the throat forces the hangers 19 to bunch together. The hangers 19 are held in position during tying by the stop hook 64 (See FIGS. 7 and 8). When the hangers 19 have reached the innermost and narrowest part of the throat, a length of plastic or paper-covered wire 65 from a supply roll 66 is wrapped around the neck of the bunched hangers 19, making a tie and securing the garments and hangers 19 together. The tie-off device 60 then retracts to its original position.

Referring now to FIGS. 7 and 8, the stop hook 64 is pivoted into and out of stopping position in a channel 67 in rail 25 by a solenoid 68. In this position, hangers 19 sent down the rail 25 are stopped by the stop hook 64, and when in position against the stop hook 64 are properly positioned for being tied together by the tie-off device 60.

The stop hook 64 is moved to the release position shown in FIG. 8 by a signal initiated by the tie-off device 60 as the device retracts after having placed the tie on the hangers 19. The tied-together hangers 19 continue sliding down the rail 25 and pass under a sensor 70, which determines if the tie-off was successful. The stop hook 64 is immediately returned to the stop position shown in FIG. 7.

If the tie-off was successful, the sensor 70, which operates on an induction principle, detects only one signal as the hangers 19 pass underneath, signifying that the hangers have been properly tied together, as shown in FIGS. 7 and 8. Since the sensor 70 is downstream from the stop hook 64, it also determines that the tied-off hangers have properly left the tie-off position. If these conditions are sensed, the divorce station 40 is signalled to begin divorcing motherhooks 22 from hangers 19 and sending the hangers 19 down rail 25 to be caught by the stop hook 64, where the process is repeated.

Figure 9:
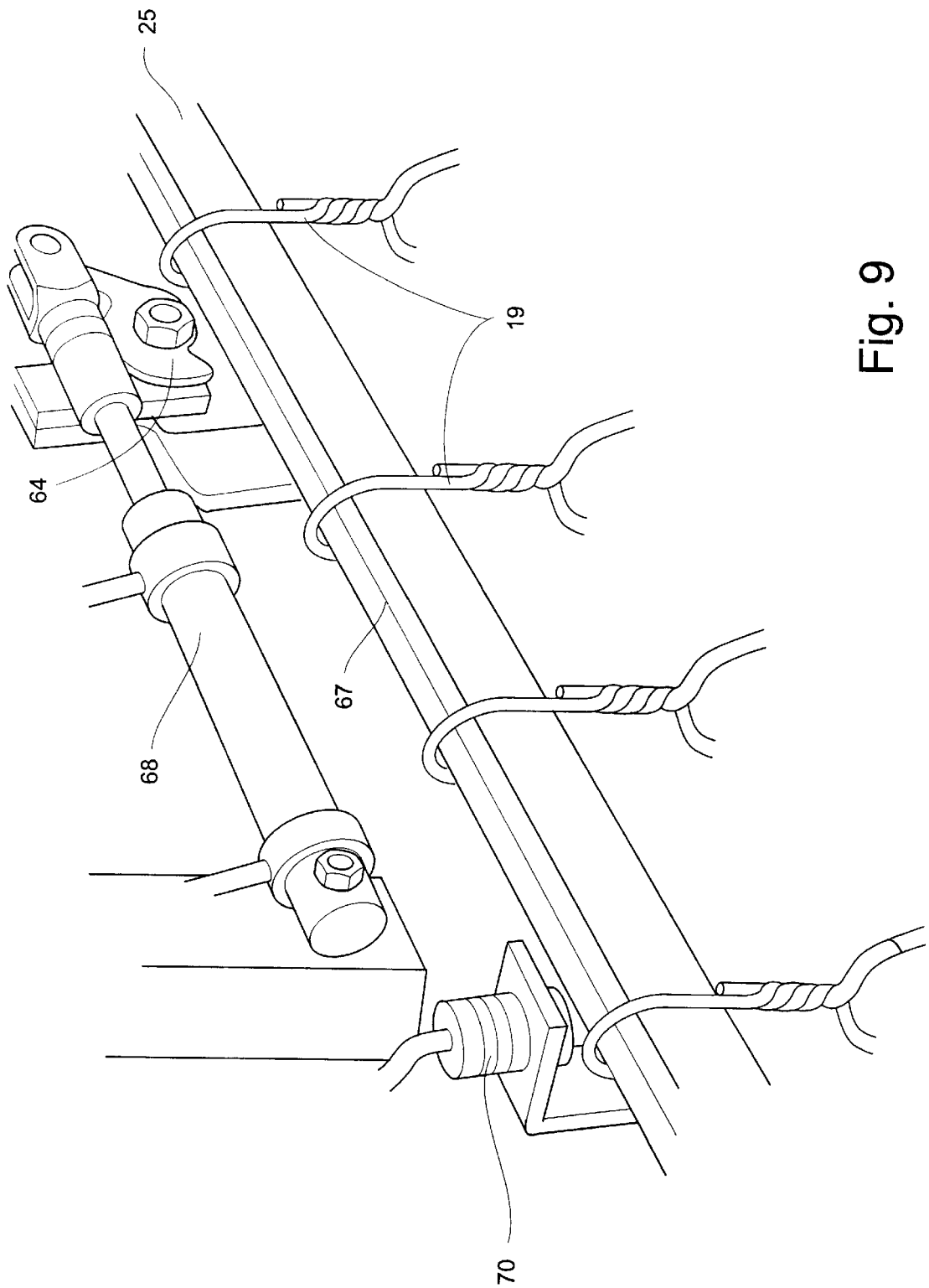
FIG. 9 is a fragmentary perspective view of the tie-off stop hook and tie-off sensor in a condition wherein the tie-off was unsuccessful.

If the tie-off has been unsuccessful, sensor 70 detects a series of signals indicative of the continued separation of the hangers as they are released and begin sliding down rail 25, as shown in FIG. 9. In this case, the sensor 70 triggers an alarm which summons an attendant.

An automatic laundry tie-off apparatus and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In an automated laundry sorting system of the type wherein previously-laundered laundry items on hangers are tagged with electronic identification devices and sorted into predetermined groups, the improvement comprising an automatic joining apparatus for electronically separating the predetermined groups from each other and physically joining together the laundry items representing a single group, and including:
   (a) identification means for identifying the laundry items in a group; and
   (b) joining apparatus for physically joining together the laundry items in the group, wherein said joining apparatus comprises:
      (i) a feed conveyor for feeding the laundry items downstream one at a time;
      (ii) a reader for reading the electronic identification device to determine the identity of the laundry item and the group to which each laundry item belongs;
      (iii) a divorcing means for separating the electronic identification device from the laundry item, wherein:
         (a) if the laundry item is determined by the reader to belong to the same group as the preceding laundry item, the divorcing means divorces the electronic identification device from the laundry item and delivers the laundry item downstream into proximity with other laundry items in the same group;
         (b) if the laundry item is determined by the reader to belong to a different group than the preceding laundry item, the divorcing means delays divorcing the electronic identification device from the laundry item; and
      (iv) signal means cooperating with said reader for communicating data representing the identity of the laundry item to the joining apparatus.

2. In an automated laundry sorting system according to claim 1, wherein said joining apparatus comprises a tie-off device for tying together the hangers on which the laundry items are carried.

3. In an automated laundry sorting system according to claim 2, wherein said laundry sorting system includes:
   (a) a limit sensor cooperating with said feed conveyor for sensing the number of laundry items in position on said feed conveyor to be fed downstream to the divorcing means; and
   (b) stop means responsive to the limit sensor for stopping the movement of the motherhooks on the feed conveyor when the number of laundry items in position to be fed downstream to the divorcing means exceeds a predetermined number equal to or less than the capacity of the divorcing means at any given time.

4. In an automated laundry sorting system according to claim 3, wherein said feed conveyor includes:
   (a) a presence sensor for determining whether laundry items are present in the feed conveyor for being fed to the divorcing means; and
   (b) a hook for selectively releasing a laundry item for movement to said divorcing station for removal of the electronic identification device.

5. In an automated laundry sorting system according to claim 4, wherein said laundry items move from said feed conveyor to said divorcing station by gravity.

6. In an automated laundry sorting system according to claim 1, wherein said electronic identification devices comprise digitally-coded passive inductance transmitters.

7. In an automated laundry sorting system according to claim 6, wherein said laundry items are carried on respective thin-gauge wire hangers, and further wherein a one of said transmitters is carried by a motherhook onto which respective wire hangers are releasably attached.

8. In an automated laundry sorting system according to claim 7, wherein said divorcing means comprises a first downwardly directed rail on which said laundry items are gravity-fed to said joining means, and a second downwardly directed rail diverging from said first rail and on which said motherhooks are conveyed to a collection station for re-use after separation from said laundry items at said divorcing station.

9. In a method for automatically sorting laundry items on hangers tagged with electronic identification devices for sorting the laundry items into predetermined groups, the improvement comprising the steps of:
   (a) electronically separating the predetermined groups from each other;
   (b) physically joining together the laundry items representing a single group;
   (c) feeding the laundry items downstream one at a time;
   (d) reading the electronic identification device to determine the identity of the laundry item and the group to which each laundry item belongs;
   (e) separating the electronic identification device from the laundry item, wherein:
      (i) if the laundry item is determined to belong to the same group as the preceding laundry item, the electronic identification device is divorced from the laundry item and the laundry item is delivered downstream into proximity with other laundry items in the same group; and
      (ii) if the laundry item is determined to belong to a different group than the preceding laundry item, the electronic identification device is delayed in separation the from the laundry item; and (f) communicating data representing the identity of the laundry item to the joining means.

10. In a method according to claim 9, wherein the step of joining the laundry items together comprises the step of tying together the hangers on which the laundry items are carried.

11. In a method according to claim 10, and including the steps of:

(a) sensing the number of laundry items in position to be conveyed downstream to where the electronic identification device is divorced from said laundry item; and (b) stopping the movement of the laundry items being fed downstream when the number of said laundry items is a predetermined number.

12. In a method according to claim 11, and including the steps of:

(a) determining whether laundry items are present on a feed conveyor for being fed to a divorcing means for divorcing the laundry item from said electronic identification device; and (b) selectively releasing a laundry item for movement to said divorcing station for removal of the electronic identification device.

13. In a method according to claim 12, and including the step of moving the laundry items into position where the step of removing the electronic identification device from the laundry item is carried out.

14. In a method according to claim 13, wherein the step of reading the electronic identification device to determine the identity of the laundry item and the group to which each laundry item belongs comprises the step of transmitting a radio frequency interrogation signal to said electronic identification device and reading an induced return signal transmitted by said electronic identification device indicative of the identity of the laundry item.

* * * * *